March 29, 1966  G. FEHLNER  3,243,234
SEAT
Filed June 25, 1964  2 Sheets-Sheet 2
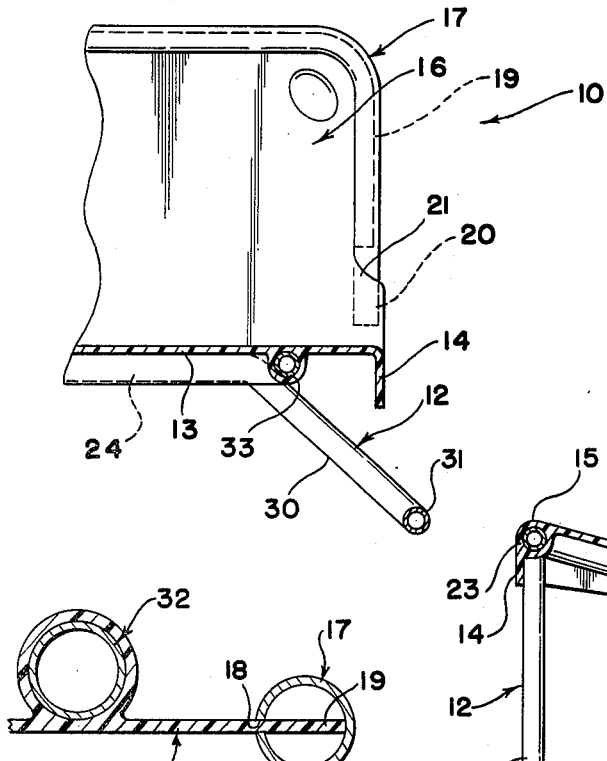
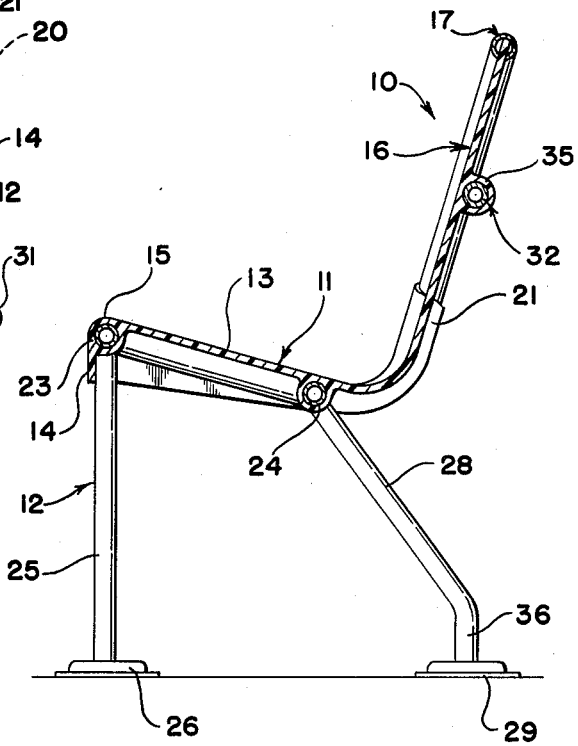
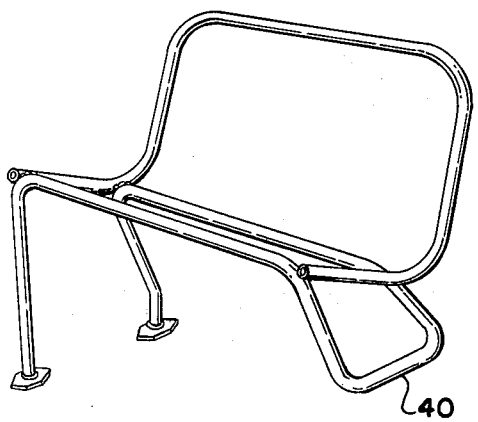
INVENTOR.
GEORGE FEHLNER
BY
*Fay & Fay*
ATTORNEYS

United States Patent Office 3,243,234
Patented Mar. 29, 1966

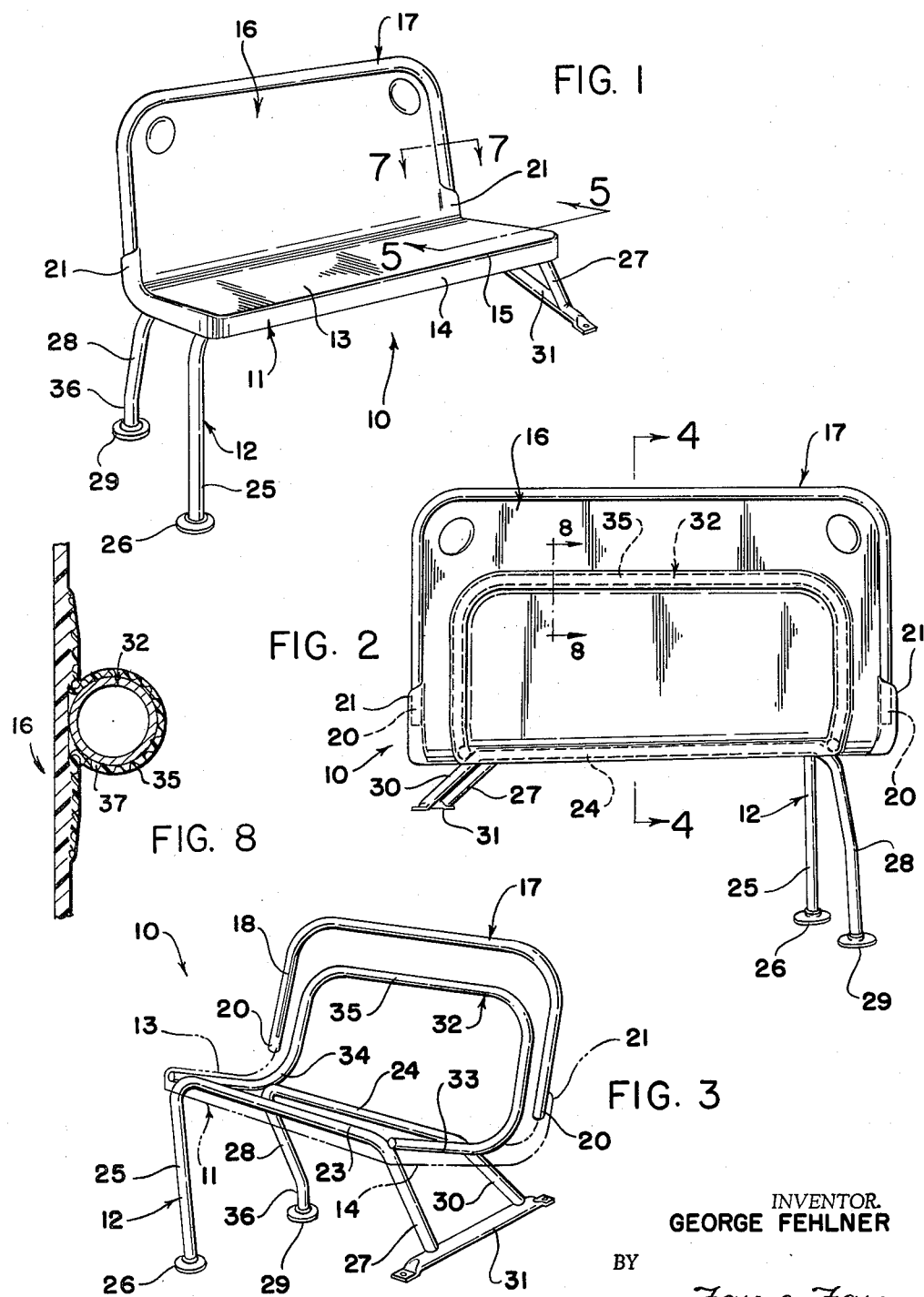

3,243,234
SEAT
George Fehlner, 4196 W. 49th St., Cleveland, Ohio
Filed June 25, 1964, Ser. No. 377,852
6 Claims. (Cl. 297—457)

This invention relates to a seat and more particularly to a seat adapted for use in a school bus or the like.

The seats normally found in a conventional school bus are a relatively expensive item. These seats traditionally have been of the upholstered variety, of a bulky configuration, and have weighed a considerable amount. Moreover, the seats heretofore known have had a relatively short life expectancy due to the normal wear and tear inflicted on the seats during the transportation of small school age children. In addition, the seats used heretofore have been susceptible to vandalism thus entailing frequent repair or replacement.

In addition to the susceptibility of conventional upholstered bus seats to wear and tear as well as vandalism, other problems have become apparent. Thus, a school bus is limited by state laws to a specific gross weight and length. In addition, minimum standards of passenger comfort must be observed so that such things as adequate knee room are provided between the seats. All of these limitations have imposed a severe restriction on the maximum number of seats which may be placed in a school bus and, therefore, the maximum number of passengers which a school bus might carry.

It is an object of this invention to provide a seat which is substantially indestructible.

It is a further object of this invention to provide a seat which withstands both normal wear and tear as well as deliberate vandalism.

Yet another object of this invention is to provide a bus seat which is of economical construction.

A further object of this invention is the provision of a bus seat which is lighter than the seats heretofore known.

Still another object of the invention is the provision of a bus seat which utilizes less space without the loss of any comfort or knee room for the passenger.

Another object of this invention is to provide a seat permitting the installation of a greater number of seats in a given length of vehicle without sacrificing the knee room between consecutive rows of seats.

The above objects as well as others which will become more apparent upon a complete reading of the following description are accomplished by a seat which comprises a tubular frame having leg portions for support thereof; a seat body including a seat and back, with the seat body being of unitary construction and formed from a resilient molded fiber glass material. The seat body is secured to the frame by a matrix of glass cloth and resin such that a substantially unitary body frame construction is produced.

Another feature of the invention resides in the provision of a U-shaped slotted tube which covers the otherwise exposed flange at the top of the seat back. The legs of the U-shaped tube are molded into the lower section of the seat back by means of fiber glass and resin thereby producing a rigidified construction. This latter arrangement enchances the safety characteristics of the seat by guarding against the injury of a passenger should he strike the otherwise uncovered raw edge of the seat back.

A still further feature of the invention includes the provision of the seat proper being formed at an upwardly tilted angle which renders the edge of the seat uncomfortable for sitting and thereby forces children in the seat to sit back in the seat rather than on the edge.

To the accomplishment of the foregoing and related objects and features, the following description sets forth in detail one preferred means of carrying out the invention and one alternative construction thereof. Such disclosed means are not meant to be limiting inasmuch as they constitute but two of the various ways in which the principles of the invention may be applied.

In the drawings wherein like reference numerals indicate like parts in the various views:

FIG. 1 is a perspective view showing the preferred embodiment of the invention;

FIG. 2 is a view similar to FIG. 1 showing the rear side of the seat;

FIG. 3 is a perspective view of the tubular frame for the seat of FIG. 1;

FIG. 4 is a side elevation view taken along line 4—4 of FIG. 2;

FIG. 5 is a view taken along line 5—5 of FIG. 1;

FIG. 6 is a view similar to FIG. 3 showing a modified construction of the tubular frame;

FIG. 7 is a view taken along line 7—7 of FIG. 1;

FIG. 8 is a view taken along line 8—8 of FIG. 2.

Referring in more detail to the drawings, there is illustrated in FIG. 1 the preferred embodiment of the bus seat which is indicated generally by the reference numeral 10. The bus seat 10 comprises a seat portion indicated by the reference numeral 11 and a frame indicated generally at 12 which serves as a support for the seat. As will appear more fully hereinafter, the seat 11 and the frame 12 are essentially of an integral construction; however, for purposes of disclosure, the two members will be treated separately.

Referring first to the seat 11 and particularly to FIGS. 1 and 4, the seat comprises a seat panel 13 with a depending flange or skirt 14 extending around the periphery thereof. As is more apparent from FIG. 4, the upper surface of the seat panel is at an angle with the horizontal axis with the forward edge 15 being the uppermost point and the seat tapering rearwardly therefrom. Correspondingly, the depth of flange 14 is greatest at the forward portion of the seat.

Formed as an integral part of the seat panel 13 is a back rest panel 16 which is substantially coextensive with the longitudinal extent of the seat panel. The back rest panel 16 is tilted rearwardly to form substantially a 90° angle with the seat portion for the comfort of the person in the seat.

The seat panel and the back rest panel are fabricated from a resilient gel-coated fiber glass material, thus providing a lightweight, strong, practically indestructible seat. The gel-coat provides a waterproof seat and prevents fiber glass skin rash. A suitable non-skid surface design would be included on the upper surface of the seat panel 13. Also, the seats may be made in any color or shade of color.

To cover the raw edge of the back rest panel 16 around its periphery thereof, there is included a tubular member 17 which is formed to the shape of the edge of the seat back. The tube 17, as shown more clearly in FIG. 7, includes a seam or slot 18 through which the peripheral edge 19 of the seat back 16 projects. The tube 17 thus encloses what would be a potentially dangerous, relatively sharp edge portion on the seat 16, with the tube 17 providing a surface having a relatively large radius of curvature so that a passenger striking the back of the seat immediately in front is less likely to sustain any injuries. The tube 17 is preferably of a fabricated stainless steel material, roll formed from flat stock, with the back panel 16 projecting to the full depth of the diameter of the tube 17.

The ends 20 of the tube 17 are received in sockets 21, thus securely attaching the tubing 17 to the seat back. The socket 21 may be formed by a plurality of methods, with laminations of glass cloth and resin being a satisfactory technique to attach the ends of the tubing 17 to the seat.

It is to be understood that other designs may be used to form the protective edge of the seat back 16. Thus, a flange similar to the flange 14 on the seat panel 13 could be formed around the entire periphery of the back rest panel 16 and a tube run on the inside of the flange thus providing the large radius which is desirable to prevent injury. However, this latter method is more expensive and produces a seat which is not as attractive as the solution illustrated in FIG. 1.

Turning to the supporting frame 12 for the seat 11 and more particularly to FIG. 3, the frame 12 comprises spaced apart tubular supporting members 23, 24. Member 23 includes a downwardly extending leg 25 with a bracket 26 attached to the lower end thereof adapted to be secured to the floor of a school bus. The member 23 at its other end includes a bent leg portion 27 which is of a length shorter than the leg portion 25 and is angularly disposed from the vertical. The support member 24 includes a leg portion 28 similar to leg 25, with a bracket 29 at one end thereof. An angularly bent leg 30 similar to leg 27 is provided at the other end of the member 24. A cross bracket 31 is attached to the end of the angularly bent legs 27, 30, with the bracket 31 being adapted to be secured to a mounting ledge normally found in a school bus adjacent the wall thereof.

The supporting members 23, 24 are secured in spaced relation one to the other by a tubular supporting frame 32. The frame 32 includes spacing arms 33, 34 which are secured by appropriate means such as welding to the central portions of the members 23, 24 thereby spacing the legs in a fixed relation. This fixed relation includes the locating of the member 24 rearwardly of the member 23 such that, with the seat 11 supported on the frame, the central portion of member 24 is slightly forward of the concavity formed at the juncture of the seat panel 13 and the back panel 16 and the bracket 29 is slightly rearward of the concavity. The tubular member 32 includes a vertical back framing member 35 which is angularly displaced relative to the vertical at an angle similar to the angle of the back panel 16 relative to the seat panel 13.

The seat 11 is assembled on the frame 12 with the under surface of the seat panel 13 resting on the arms 33, 34 and the central portions of the members 23, 24. The central portion of the member 23 fits into the concave recess formed by the front portion of the depending flange 14 and the seat panel 13, as shown in FIG. 4. The leg 28 on the member 24 extends rearwardly of the seat with the end of the leg 28 being bent downwardly as shown at 36. The portion 36 is generally in vertical alignment with the rearwardmost extent of the back rest portion 16. The seat back portion 16 rests against the upright tubular frame 35 as is believed to be readily apparent.

To provide a completely rigidified construction and eliminate any possibility of vandalism, the frame 12 is integrally secured to the seat 11 by a lamination of glass cloth 37 and a suitable resin so that the tubular frame member becomes, in effect, an integral part of the seat. This is shown most clearly in the magnified view of FIG. 8 wherein the tubular framing member 35 is illustrated as being enclosed in the glass cloth 37 and bonded by resin such that a "molded in" construction is obtained. The same construction as that shown in FIG. 8 is utilized in securing the other portions of the seat body to the remaining tubular supporting members.

Turning to the embodiment of FIG. 6, the seat construction is, essentially, the same as that discussed above in connection with FIG. 1. However, the frame construction has been modified in that the leg members are constructed from a single piece of tubing which is bent to form a mounting leg 40 which replaces the separate bracket 31 used in conjunction with the frame of FIG. 3. The frame of FIG. 6 is attached to the seat in the manner described hereinabove. It is believed that other construction of frames will suggest themselves to those having ordinary skill in the art and the particular frame constructions shown here are but illustrative of the types which might be utilized.

Several features of the novel seat herein disclosed are to be emphasized. By decreasing the seat back thickness as compared to that which was present in the upholstered seats heretofore known, there has been provided a seat which permits the installation of more seats in a given length of bus. The result is that, in general, six additional passengers can be carried without a change in the vehicle classification. Thus, a 66-passenger bus becomes a 72-passenger bus without the necessity of increasing the capacity of the brakes, axle or engine. This increase in capacity is due to the diminished weight and overall dimensions of the integral fiber glass seat hereinabove disclosed as compared to the expensive upholstered seats used previously.

A four legged model of the seat could be used as well as the two legged model shown herein depending upon the particular construction of the bus in which the seat is to be installed. The feature to be emphasized, however, is the provision of the tubular frame molded to the fiber glass seat to provide an integral construction as hereinbefore described.

Additional modifications and changes will suggest themselves to those having ordinary skill in the art. Changes such as these are contemplated by the principles of this invention so that although for ease of description, the principles of the invention have been set forth in connection with but a single illustrated embodiment, it is not intended that this illustrated embodiment or the terminology employed in describing it is to be limiting; but rather, it is my desire to be restricted only by the scope of the appended claims.

I claim:

1. A seat adapted for use in a school bus or the like comprising;
   a frame having leg portions for support thereof;
   a seat body including a seat panel and back rest panel;
   said seat body being constructed from a resilient molded fiber glass material with said seat panel and said back rest panel being of a unitary construction;
   said seat body being supported on;
   fiber glass cloth means enclosing portions of said frame at the points of contact between said frame and said body and overlying the adjacent portions of said seat body; and
   adhesive means securing said fiber glass cloth means to said seat body and said frame whereby said body is integrally secured to said frame.

2. The combination of claim 1 and further including the provision of a tubular member having a slot formed therein, with the edge of said back rest panel being received in the slot in said tubular member; and
   means on said seat body securing the ends of said tubular member to said body.

3. The seat of claim 1 wherein said frame includes:
   a substantially vertically extending back rest member in supporting engagement with the back side of said back rest panel;
   said back rest member terminating at a point below the upper edge of said back rest panel, with said cloth means and adhesive means rigidly securing said back rest member to said back rest panel.

4. A seat adapted for use in a school bus or the like comprising;

a seat body including a seat panel and back rest panel;
at least said back rest panel having a relatively thin cross sectional dimension;
supporting means for said seat body;
a tubular member having a slot formed therein;
said tubular member conforming to the configuration of said back rest panel with the thin edge of said back rest panel being received in the slot; and
means rigidly securing the ends of said tubular member to said body.

5. The seat of claim 4 wherein said latter-mentioned means comprises glass cloth and resin enclosing said ends of said tubular member and adhering to the adjacent areas of said seat body.

6. The combination of claim 1 wherein said seat panel includes a depending flange extending around the periphery thereof with the depth of said flange being greatest at the forward edge of said seat panel and decreasing in depth as said flange proceeds toward the juncture of said seat panel and said back rest panel.

References Cited by the Examiner

UNITED STATES PATENTS

| | | | |
|---|---|---|---|
| 2,159,098 | 5/1939 | Morgan | 297—445 |
| 2,390,878 | 12/1945 | Greitzer | 207—444 |
| 2,572,482 | 10/1951 | Hoven et al. | 297—451 |
| 2,838,100 | 6/1958 | Follows | 297—421 |
| 2,845,111 | 7/1958 | Barecki | 297—451 |
| 2,862,650 | 12/1958 | Scott et al. | 182—46 |
| 2,863,797 | 12/1958 | Meyer | 161—11 |
| 2,907,378 | 10/1959 | Barecki | 297—337 |
| 3,069,701 | 12/1962 | McInerney | 5—351 |
| 3,082,486 | 3/1963 | Khawam et al. | 264—45 |
| 3,112,987 | 12/1963 | Griffiths et al. | 264—45 |
| 3,144,271 | 8/1964 | Lieberman et al. | 297—239 |

FOREIGN PATENTS 919,259  10/1954  Germany.

FRANK B. SHERRY, *Primary Examiner.*
C. A. NUNBERG, *Assistant Examiner.*